(12) United States Patent
Russo et al.

(10) Patent No.: US 8,318,869 B2
(45) Date of Patent: Nov. 27, 2012

(54) FLUORINATED POLYURETHANE COMPOSITION

(75) Inventors: Antonio Russo, Milan (IT); Piero Gavezotti, Milan (IT); Michael Quallo, Bear, DE (US)

(73) Assignee: Solvay Solexis S.p.A., Bollate (IT)

( * ) Notice: Subject to any disclaimer, the term of this patent is extended or adjusted under 35 U.S.C. 154(b) by 0 days.

(21) Appl. No.: 12/599,909

(22) PCT Filed: May 13, 2008

(86) PCT No.: PCT/EP2008/055838
§ 371 (c)(1), (2), (4) Date: Nov. 12, 2009

(87) PCT Pub. No.: WO2008/138927
PCT Pub. Date: Nov. 20, 2008

(65) Prior Publication Data
US 2010/0311893 A1    Dec. 9, 2010

Related U.S. Application Data

(60) Provisional application No. 60/938,276, filed on May 16, 2007.

(30) Foreign Application Priority Data
Jun. 22, 2007 (EP) .................... 07110833

(51) Int. Cl.
*C08G 18/08* (2006.01)

(52) U.S. Cl. ........ 525/460; 525/403; 525/410; 525/453; 525/458; 528/60; 528/66; 528/70; 528/401; 528/402

(58) Field of Classification Search ............... 525/403, 525/410, 453, 458, 460; 528/60, 66, 70, 528/401, 402
See application file for complete search history.

(56) References Cited

U.S. PATENT DOCUMENTS

| | | | |
|---|---|---|---|
| 2,803,615 A | 8/1957 | Ahlbrecht et al. | |
| 2,839,513 A | 6/1958 | Ahlbrecht et al. | |
| 2,995,542 A | 8/1961 | Brown | |
| 3,242,218 A | 3/1966 | Miller | |
| 3,356,628 A | 12/1967 | Samuel et al. | |
| 3,715,378 A | 2/1973 | Belardinelli et al. | |
| 3,814,741 A | 6/1974 | Caporiccio et al. | |
| 4,525,423 A | 6/1985 | Lynn et al. | |
| 4,529,658 A | 7/1985 | Schwartz et al. | |
| 5,149,842 A | 9/1992 | Sianesi et al. | |
| 5,258,110 A | 11/1993 | Sianesi et al. | |
| 5,401,553 A | 3/1995 | Miwa et al. | |
| 6,500,894 B1 | 12/2002 | Lenti et al. | |
| 2003/0229176 A1 * | 12/2003 | Trombetta et al. | 524/589 |
| 2007/0014927 A1 | 1/2007 | Buckanin et al. | |

FOREIGN PATENT DOCUMENTS

| | | |
|---|---|---|
| EP | 239123 A2 | 9/1987 |
| EP | 0533159 A1 | 3/1993 |
| EP | 1038919 A1 | 9/2000 |
| EP | 1327644 A1 | 7/2003 |
| EP | 1369442 A1 | 12/2003 |
| EP | 1559733 A1 | 8/2005 |
| GB | 1104482 A | 2/1968 |

* cited by examiner

*Primary Examiner* — David W Wu
*Assistant Examiner* — Robert Jones, Jr.
(74) *Attorney, Agent, or Firm* — Arent Fox LLP

(57) ABSTRACT

A composition useful for imparting durable stain repellence and soil release properties to textile substrates, a method for treating textile substrates using such composition, and the textile substrates obtained therefrom. The composition comprises: (A) at least one fluorinated ionisable polyurethane polymer (PUR) being free from perfluoroalkyl chains and comprising at least one fluorinated block comprising a fluoropolyoxyalkene chain, and at least one functional block comprising an hydrocarbon chain ($R_{HC}$) having from 2 to 14 carbon atoms, said chain ($R_{HC}$) comprising at least one ionisable group, said blocks being linked by urethane moieties of formula (I), formula (I)

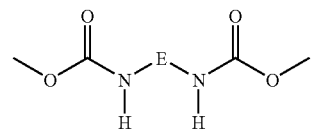

wherein E is a divalent hydrocarbon carbon group; (B) at least one fluorocarbon polymer (F) comprising at least one perfluoroalkyl chain ($R_f$) linked by one or more ester moiety of formula (II) and/or urethane moiety of formula (III) and/or urea moiety of formula (IV); and (C) at least one crosslinking agent.

formula (II)

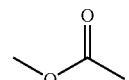

formula (III)

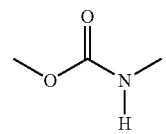

formula (IV)

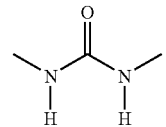

12 Claims, No Drawings

FLUORINATED POLYURETHANE COMPOSITION

CROSS-REFERENCE TO RELATED APPLICATIONS

This application is a U.S. national stage application under 35 U.S.C. §371 of International Application No. PCT/EP2008/055838 filed May 13, 2008, which claims priority to European Application No. 07110833.6 filed Jun. 22, 2007 and to U.S. Provisional Application No. 60/938,276 filed May 16, 2007, these applications being incorporated herein by reference in their entirety for all purposes.

TECHNICAL FIELD

The present invention relates to a composition for imparting improved and durable water and oil repellence and soil release properties to textile substrates, as well as to a process for treating such textile substrates and to the products produced by the treatment process.

BACKGROUND ART

Substrates that possess water and oil repellence are desirable in many textile applications, and have been manufactured for some time. Water and oil repellence generally means the ability of the textile to block water and oil from penetrating into the fibers of the textile. Examples include rainwear, upholstery applications, carpet, apparel and the like. These articles are generally manufactured by applying suitable fluorocarbon polymers to the surface of the textile, followed by drying and curing the substrate to properly align the fluorochemical segments of the polymers. Fluorochemicals also help to reduce the tendency of soil, oil, and water to adhere to the fibers of the substrate. These fluorochemicals typically include a fluorinated component and a nonfluorinated polymeric backbone. The important feature of the polymeric backbone is that it is capable of yielding a durable treatment on the surface of the fiber.

Similarly, substrates possessing acceptable soil release characteristics are known. As used herein, soil releasability is defined as the degree to which a soiled substrate approaches its original, unsoiled appearance as a result of a care procedure. Generally, soil release properties are obtained increasing polarity and/or hydrophilicity of textile substrates so that interactions with water and detergents are favoured. Examples include natural fibers such as cotton, hydrophilic synthetic fibers such as nylon and acrylic, and synthetic polymers that have been modified to improve soil releasability by the application of hydrophilic soil release polymers. Suitable soil release polymers include carboxylic acid containing copolymers, sulfonic acid containing copolymers, ethoxylated polyesters, certain polyacrylamide polymers and certain cellulose derivatives.

Extensive efforts have been made to produce a textile substrate having the properties of durable water and oil repellence, as well as improved durable soil release characteristics.

Generally, treatments are available to impart either one of these properties to a textile, but it has proven difficult to provide both properties to a single substrate for any appreciable length of time.

Natural fibers such as cotton and wool exhibit little water/oil repellence, but when they do become soiled, they are readily cleaned, thus exhibiting a high level of soil releasability. Many synthetics, notably polyester, exhibit a low level of soil releasability. Thus, the trend of producing textiles having a natural/synthetic blend of fibers tends to aggravate the situation because such blends are easily soiled and the absorbed soil is difficult to wash out.

Fluorinated (meth)acrylic polymers have been proposed in the past for increasing stain resistance and providing textile substrates with a inert fluorocarbon-like outer surface, oleophobic and hydrophobic. Examples of such fluorinated (meth)acrylic polymers are notably described in U.S. Pat. No. 2,803,615 (3M COMPANY) Aug. 20, 1957, U.S. Pat. No. 2,995,542 (3M COMPANY) Aug. 8, 1961, U.S. Pat. No. 3,356,628 (3M COMPANY) May 12, 1967, U.S. Pat. No. 4,525,423 (3M COMPANY) Jun. 25, 1985, U.S. Pat. No. 4,529,658 (3M COMPANY) Jul. 16, 1985, U.S. Pat. No. 2,839,513 (3M COMPANY) Jun. 17, 1958 and U.S. Pat. No. 3,814,741 (MONTECATINI EDISON) Jun. 4, 1974.

However, these and other fluorocarbon polymer of the prior art tend to make the soil release properties worse because the aqueous washing medium cannot properly wet the substrate, and hence cannot remove the stains. Conversely, the addition of hydrophilic soil release polymers tends to enhance the soil release characteristics, but limits the ability of the textile to resist and repel water and oil based liquids.

Examples of such copolymers include SCOTCHGUARD® FC-248 from 3M, and REPEARL® F-84, marketed by Mitsubishi Chemical. These products provide a certain degree of water/oil repellency and a certain soil release to many substrates, but the oil/water repellency and soil release capabilities are lower from those obtained, respectively, with traditional fluorochemical polymer treatments and with hydrophilic soil release polymers or surfactants treatments. Further, the copolymers tend to lack durability for many applications. Durability is defined herein as retaining an acceptable level of the desired function through a reasonable number of care cycles.

One method for treating substrates to simultaneously impart both of these characteristics has been to use copolymers containing fluorocarbon oil/water repellent segments and hydrophilic soil release segments.

As mentioned above, fluorocarbons have been applied to textiles in attempts to solve this problem by providing limited protection against oily stains due to the oleophobic properties of most fluorocarbons.

U.S. Pat. No. 6,500,894 (AUSIMONT SPA (IT)) Dec. 31, 2002 discloses aqueous dispersions for oil&water repellence treatments of textiles, comprising a mixture of the following fluorinated polymers: A) (meth)acrylic (co)polymers containing fluorine, and B) cationic ionomers of fluorinated polyurethanes based on (per) fluoropolyethers. These compositions possess relatively poor oil&water repellence and stain release capabilities. Moreover, their durability is not satisfactory.

EP 1327644 A (SOLVAY SOLEXIS SPA (IT)) Jul. 16, 2003 discloses a cationic fluorinated polyurethane polymer comprising perfluoropolyoxyalkylene chains having terminal capped NCO groups for surface hydro- and oil-repellence treatment of textiles. While performances are relatively poor, durability is unsatisfactory.

There is thus still a need in the art for a composition able to imparting to textile substrates at the same time durable and outstanding anti-stain capabilities (i.e. water and oil-repellence) and durable and outstanding soil release properties.

DISCLOSURE OF INVENTION

It is thus an object of the invention a composition useful for imparting durable stain repellence and soil release properties to textile substrates, said composition comprising:

(A) at least one fluorinated ionisable polyurethane polymer [polymer (PUR)] comprising at least one fluorinated block comprising a fluoropolyoxyalkene chain [chain ($R_{of}$)], and at least one functional block comprising an hydrocarbon chain [chain ($R_{HC}$)] having from 2 to 14 carbon atoms, optionally comprising one or more aromatic or cycloaliphatic group, said chain ($R_{HC}$) comprising at least one ionisable group, said blocks being linked by urethane moieties of formula (I):

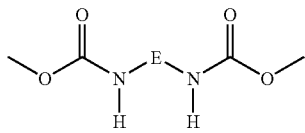

formula (I)

wherein E is a divalent hydrocarbon carbon group, linear or branched, optionally comprising aromatic rings, said polymer (PUR) being free from perfluoroalkyl chains [chain ($R_f$)]; (B) at least one fluorocarbon polymer [polymer (F)] comprising at least one perfluoroalkyl chain [chain ($R_f$)] linked by one or more ester moiety of formula (II) and/or urethane moiety of formula (III) and/or urea moiety of formula (IV):

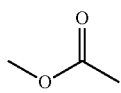

formula (II)

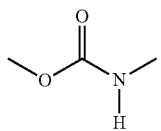

formula (III)

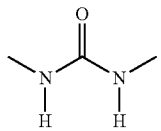

formula (IV)

and
(C) at least one crosslinking agent.

The Applicant has surprisingly found that by combining components (A), (B) and (C) as above detailed, it is possible to take advantage of an unexpected synergistic effect enabling substantial enhancement of both anti-stain (water and oil repellence) and soil-release properties of textiles treated therewith.

Moreover, above mentioned somewhere conflicting features are obtained substantially limiting the involvement of perfluoroalkyl chain-containing components (component (B) of the inventive composition), whose negative impact on the environment has recently captured increasing attention.

The Applicant thinks, without this limiting the scope of the invention, that component (A) [polymer (PUR)] advantageously provides for soil release properties, while component (B) [polymer (F)] advantageously provides for stain repellence; component (C) [cross-linking agent] cooperates synergically with both components (A) and (B) so as to obtain substantial enhancement and durability of properties conferred by combinations of (A) and (B).

Still objects of the invention are a process for the manufacture of the composition as above described and the use of the composition as above detailed for the treatment of textile substrates, as well as textile substrates obtained from said treatment.

The expression "at least one fluorinated block comprising a fluoropolyoxyalkene chain [chain ($R_{of}$)]" and "at least one functional block comprising an hydrocarbon chain [chain ($R_{HC}$)]" are understood to mean that the polymer (PUR) may comprise one or more than one fluorinated block and one or more than one functional block. Generally polymer (PUR) comprises several fluorinated blocks and several functional blocks. Optionally, in addition, polymer (PUR) might comprise additional recurring units derived from well-known polyurethane modifiers, e.g. from chain extenders, and the like. It is nevertheless understood that the polymer (PUR) is free from perfluoroalkyl chains, in particular from perfluoroalkyl chains having 8 carbon atoms or more. Polymer (PUR) is thus distinguishable from polymer (F) which comprises, as essential feature, one or more perfluoroalkyl chains [chain ($R_f$)].

Chain ($R_{of}$) of the polymer (PUR) advantageously comprises (preferably consists essentially of) repeating units $R^o$, said repeating units $R^o$, randomly distributed along the fluoropolyoxyalkene chain, being chosen among the group consisting of:

—CFXO—, wherein X is F or $CF_3$, (i)

—$CF_2$CFXO—, wherein X is F or $CF_3$, (ii)

—$CF_2CF_2CF_2$O—. (iii)

Preferably chain $R_{of}$ is a fluoropolyoxyalkene chain comprising (preferably consisting essentially of) repeating units $R^{o'}$, said repeating units, randomly distributed along the fluoropolyoxyalkene chain, being chosen among the group consisting of:

—$CF_2$O—, (i)

—$CF_2CF_2$O—. (ii)

The molar ratio between recurring units $R^{o'}$ of type (ii) and recurring units of type (i) ranges advantageously from 0.1 to 10, preferably from 0.5 to 5.

Advantageously the chain $R_{of}$ comprises terminal bridging groups bound to the urethane moiety of formula
—$CF_2CH_2(OCH_2CH_2)_{s'}$—, wherein s', equal or different at each occurrence, is chosen among integers from 0 to 5.

For the avoidance of doubt, above mentioned terminal bridging groups between chain $R_{of}$ and urethane moiety are bound as depicted in the following scheme:

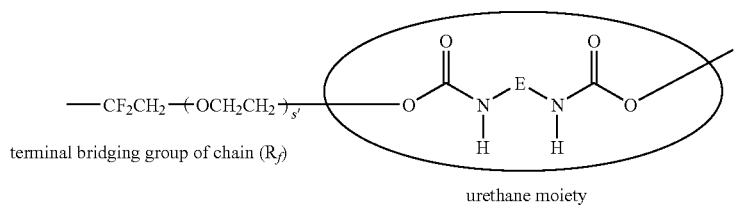

Chain ($R_{HC}$) of the polymer (PUR) generally has from 2 to 14 carbon atoms and optionally comprises one or more aromatic or cycloaliphatic group.

Chain ($R_{HC}$) of the polymer (PUR) comprises at least one ionisable group, i.e. a group yielding a cationic or an anionic group in appropriate pH conditions. Among suitable ionisable groups mention can be notably made of sulphonic acid groups of formula —$SO_3H$, carboxylic acid groups of formula —COOH, and of amine groups, either comprised in chain ($R_{HC}$) backbone of formula —N($R_N$)—, wherein $R_N$ is selected among H and hydrocarbon groups having 1 to 6 carbon atoms, or comprised in side groups as —N($R_{N1}$)($R_{N2}$), wherein $R_{N1}$ and $R_{N2}$, equal or different from each other, are independently selected from H and hydrocarbon groups having 1 to 6 carbon atoms.

Preferred chain ($R'_{HC}$) is chosen among:

(j) carboxylic-containing chain ($R_{HC}$) of formula:

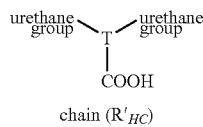

wherein T is an hydrocarbon trivalent group, linear or branched, cyclic or not, aliphatic or aromatic, comprising from 2 to 12 carbon atoms; chain ($R'_{HC}$) of formula -T(COOH)— is preferably selected among the followings:

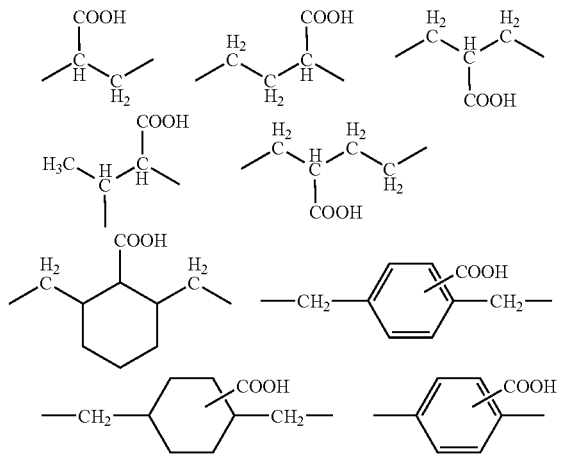

(jj) amine-containing chain ($R''_{HC}$) of formula:

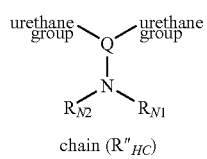

wherein $R_{N1}$ and $R_{N2}$ have the meanings as above defined, Q is an hydrocarbon trivalent group, linear or branched, cyclic or not, aliphatic or aromatic, comprising from 2 to 12 carbon atoms; chain ($R''_{HC}$) of formula -Q[N($R_{N1}$)($R_{N2}$)]— preferably complies with formula here below:

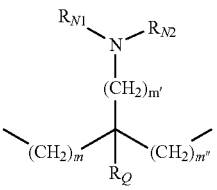

wherein $R_{N1}$ and $R_{N2}$ have the meanings as above defined, preferably $R_{N1}$ and $R_{N2}$ being independently selected among $C_1$-$C_4$ alkyl groups, linear or branched; m, m', m" are integers from 0 to 4, with the provision that at least one of m and m" is greater than zero; $R_Q$ being H or a $C_1$-$C_4$ alkyl group, linear or branched. Preferred amine-containing chain ($R''_{HC}$) are those of formulae —CH($CH_2$—N($C_2H_5$)$_2$)—$CH_2$— and/or —CH($CH_2$—N($CH_3$)$_2$)—$CH_2$—;

(jjj) amine-containing chain ($R'''_{HC}$) of formula:

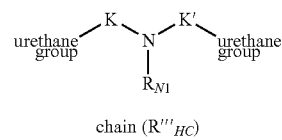

wherein $R_{N1}$ has the meaning as above defined, preferably $R_{N1}$ being selected among $C_1$-$C_4$ alkyl groups; K and K' being divalent hydrocarbon groups having 1 to 6 carbon atoms.

Divalent hydrocarbon group E of urethane moieties is notably chosen among:

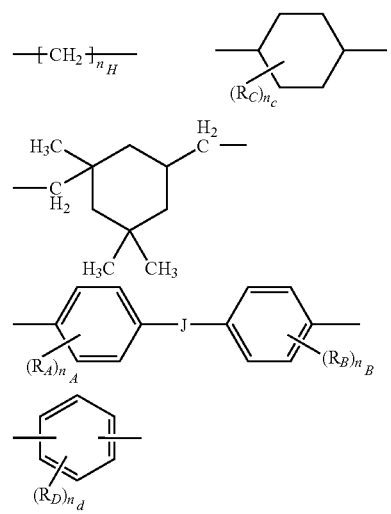

and mixtures thereof;
wherein:
  $n_H$ is an integer from 1 to 12, preferably equal to 6;
  J is a divalent bridging group chosen among: a single bond; a methylene group (—$CH_2$—); an oxygen atom (—O—); a —C($CH_3$)$_2$— group; a —C($CF_3$)$_2$— group; a —$SO_2$— group; a —C(O)— group; preferably J is a methylene group
  each of $R_A$, $R_B$, $R_C$, $R_D$, equal or different at each occurrence, is independently a halogen atom (e.g. Cl, Br, F), a $C_1$-$C_6$ hydrocarbon group (e.g. methyl, ethyl), a substituent group like notably —$OR_H$, —$NR_{H'}R_{H''}$, —C(O)—R$_{H'''}$, wherein R$_H$, R$_{H'}$, R$_{H''}$, R$_{H'''}$, equal or different each other, are independently at each occurrence a hydrogen atom or a C$_1$-C$_6$ hydrocarbon group;

n$_A$, n$_B$, n$_d$, are independently an integer chosen between 0 and 4;

n$_C$ is an integer from 0 to 10.

The polymer (PUR) of the composition of the invention can be notably produced by reacting at least one hydroxyl-terminated perfluoropolyoxyalkylene complying with formula (V) here below:

$$Z\text{—}O\text{—}R_{of}\text{—}Y \qquad \text{formula (V)}$$

wherein:

R$_{of}$ has the same meaning as above defined;

Z and Y, equal or different each other are, at each occurrence, independently functional hydroxyl groups complying with formula —CF$_2$CH$_2$O(CH$_2$CH$_2$O)$_{s'}$H, wherein s', equal or different at each occurrence, is chosen among integers from 0 to 5, and at least one functionalized diol of formula HO—R$_{HC}$—OH comprising at least one ionisable group, wherein R$_{HC}$ has the same meaning as above defined, with at least one diisocyanate of formula OCN-E-NCO, wherein E has the meaning as above defined, and, optionally, one or more chain extender with a molecular weight of 60 to 450 g/mol chosen among diols of formula HO—R$_{diol}$—OH and/or diamines of formula H$_2$N—R$_{diamine}$—NH$_2$, wherein R$_{diol}$ and R$_{diamine}$ are C$_2$-C$_{14}$ hydrocarbon groups, optionally containing additional functional groups.

The hydroxyl-terminated perfluoropolyoxyalkylenes can be prepared starting from the corresponding (per)fluoropolyoxy-alkylenes having —COF end groups as taught in GB 1104482 (MONTEDISON SPA) Feb. 28, 1968, U.S. Pat. No. 3,715,378 (MONTEDISON SPA) Feb. 6, 1973, U.S. Pat. No. 3,242,218 (DUPONT) Mar. 22, 1966, EP 239123 A (AUSIMONT S.P.A.) Sep. 30, 1987, U.S. Pat. No. 5,149,842 (AUSIMONT SRL (IT)) Sep. 22, 1992, U.S. Pat. No. 5,258,110 (AUSIMONT SRL (IT)) Feb. 11, 1993.

Preferably the diisocyanates of formula OCN-E-NCO are selected from the following: hexamethylendiisocyanate (HDI), trimethylhexamethylenediisocyanate, isophoron diisocyanate (IPDI), 4,4'-methylenebis(cyclohexylisocyanate) (H12-MDI), cyclohexyl-1,4-diisocyanate, 4,4'-methylenebis(phenylisocyanate) (MDI) or its isomers, toluene 2,4-diisocyanate (TDI) or isomers thereof, xylylene diisocyanate, naphthalene-1,5-diisocyanate, p-phenylen-diisocyanate.

Preferably, the chain extended is an aliphatic diol or diamine with 2 to 14 carbon atoms, such as e.g. ethanediol, 1,4-butanediol, 1,6-hexanediol, diethylene glycol, dipropylene glycol and more preferably 1,4-butanediol; or (cyclo) aliphatic diamines such as e.g. isophoronediamine, ethylene diamine, 1,2-propylenediamine, 1,3-propylenediamine, N-methyl-propylene-1,3-diamine, N,N'-dimethylethylenediamine. Most preferred chain extender is 1,4-butanediol.

According to an embodiment of the invention, the chain extender is a diamine comprising a siloxane group of formula:

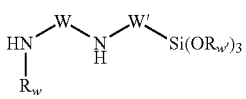

wherein:

R$_w$ and R$_{w'}$, equal or different from each other and at each occurrence, are independently selected from hydrogen and/or C$_1$-C$_6$ hydrocarbon groups, preferably R$_w$ being hydrogen and R$_{w'}$ being chosen among C$_1$-C$_6$ hydrocarbon groups, W and W', equal or different from each other, represent divalent hydrocarbon group having 1 to 12 carbon atoms.

Diamines comprising a siloxane group suitable to the purpose of the invention are notably those disclosed in EP 1559733 A (SOLVAY SOLEXIS SPA) Aug. 3, 2005. Non limitative examples of siloxane-comprising diamines are notably N-(2-aminoethyl)-3-aminopropyltrimethoxysilane of formula: H$_2$N—(CH$_2$)$_2$—NH—(CH$_2$)$_3$—Si(OCH$_3$)$_3$, N-(2-aminoethyl)-2-aminoethyltrimethoxysilane of formula:

$$H_2N\text{—}(CH_2)_2\text{—}NH\text{—}(CH_2)_2\text{—}Si(OCH_3)_3,$$

N-(3-aminopropyl)-3-aminopropyltrimethoxysilane of formula:

$$H_2N\text{—}(CH_2)_3\text{—}NH\text{—}(CH_2)_3\text{—}Si(OCH_3)_3.$$

The composition of the invention advantageously comprises at least 50% wt, preferably of at least 55% wt of component (A) as above described, with respect to the total weight of (A), (B) and (C).

The composition of the invention advantageously comprises at most 80% wt, preferably of at most 75% wt, more preferably of at most 70% wt of component (A) as above described, with respect to the total weight of (A), (B) and (C).

The composition of the invention comprises at least one fluorocarbon polymer [polymer (F)], that is to say that it contains one or more than one polymer (F).

Polymer (F) comprises at least one perfluoroalkyl chain [chain (R$_f$)]: said chain (R$_f$) can be part of the polymer (F) backbone or can be present in polymer (F) as pendant side chain.

The term perfluoroalkyl chain [chain (R$_f$)] is intended to denote an alkyl chain, free notably from ether linkage, wherein valence of carbon atoms comprised therein are saturated with fluorine atoms. Generally the perfluoroalkyl chain comprises from 4 to 20 carbon atoms; nevertheless, best performances are obtained when the chain (R$_f$) comprises from 6 to 12 carbon atoms. Polymer (F) comprising chains (R$_f$) having an average number of carbon atoms of about 8 to about 10 are more particularly preferred.

Preferably, the polymer (F) comprises at least one perfluoroalkyl chain [chain (R$_f$)] linked by one or more ester moiety of formula (II) and/or urethane moiety of formula (III), as above detailed.

According to a first embodiment of the invention, the polymer (F) comprises said chain (R$_f$) linked by one or more ester moiety of formula (II), as above detailed.

Polymer (F) according to this first embodiment of the invention is preferably selected among fluorinated (meth) acrylic polymers comprising recurring units derived from (meth)acrylic monomers comprising a C$_3$-C$_{30}$ perfluoroalkyl chain.

Typically, polymer (F) according to this first embodiment of the invention comprises recurring units derived from at least one (meth)acrylic monomer [monomer (MA)] of formula:

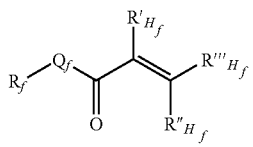

wherein:

Q is a divalent radical of 0 to 12 carbon atoms; Q can contain skeletal nitrogen, oxygen or sulphur atoms. Suitable Q radicals include —O—, —$SO_2$—N($R^*_{Hf}$)—, —$CH_2$—O—, —$C_2H_4$—O—, —$C_4H_8$—O—, —$C_6H_4$—O—, —$C_6H_2C_6H_4CH_2$—O—, —$C_2H_4$—S—$C_2H_4$—O—, —$C_2H_4OC_4H_8$—O—, —$CH_2OC_2H_4$—O—, —$SO_2N(R^*_{Hf})$—$C_2H_4$—O—, —$CON(R^*_{Hf})C_2H_4$—O—, —$C_3H_6CON(R^*_{Hf})C_2H_4$—O—, —$C_2H_4$—N($R^*_{Hf}$)$C_2H_4$—O—, —$COOCH_2C(CH_3)_2CH_2$—O—, —$SO_2$—N($R^*_{Hf}$)—$CH_2CH(CH_3)$—O—, and —$C_2H_4SO_2N(R^*_{Hf})C_4H_8$—O—, where $R^*_{Hf}$ is H or a $C_{1-4}$ alkyl radical. Preferably, Q is —$C_2H_4$—O—, or —$SO_2$—N($R^*_{Hf}$)$C_2H_4$—O—;

$R'_{Hf}$, $R''_{Hf}$, $R'''_{Hf}$, equal or different from each other, are independently H or a $C_{1-4}$ alkyl radical; preferably $R''_{Hf}$, $R'''_{Hf}$ are H and $R'_{Hf}$ is H or methyl;

$R_f$ has the same meaning as above defined; preferably $R_f$ is a perfluoroaliphatic group, linear or branched, cyclic or not, comprising 4 to 20 carbon atoms; more preferably $R_f$ is chosen among: $CF_3(CF_2)_{nf}$—, wherein $n_f$ is an integer from 3 to 15, preferably from 5 to 11.

Non limitative examples of monomers (MA) are notably $C_8F_{17}$—$C_2H_4$—O—COCH=$CH_2$, $C_{12}F_{25}$—$C_2H_4$—O—COCH=$CH_2$, 4-$C_2F_5$—$C_6F_{10}$—$C_2H_4$—O—COCH=$CH_2$, $C_6F_{13}$—$C_2H_4$—O—COCH=$CH_2$, $C_8F_{17}SO_2N(CH_3)CH_2CH_2OCOCH$=$CH_2$, $C_6F_{13}$—$C_2H_4$—S—$C_8F_{17}OCOCH$=$CH_2$, 4-$C_2F_5$—$C_6F_{10}$—$CH_2OCOCH$=$CH_2$, $C_7F_{15}$—$CH_2OCOCH$=$CH_2$, $C_7F_{15}$—CO—N($CH_3$)—$C_2H_4OCOCH$=$CH_2$, ($CF_3$)$_2CF(CF_2)_6$ $CH_2CH_2OCOCH$=$CH_2$, $C_8F_{17}$—$C_2H_4$—$SO_2$—N($C_3H_7$) $C_2H_4OCOCH$=$CH_2$, $C_7F_{15}$—$C_2H_4$—CONH—$C_4H_8$—OCOCH=$CH_2$, $C_8F_{17}SO_2N(C_2H_5)$—$C_4H_8$—OCOCH=$CH_2$, $C_8F_{17}$—$SO_2$—N($C_3H_7$)—COCH=$CH_2$, $C_{12}F_{25}$—$SO_2$—N($C_3H_7$)—COCH=$CH_2$, 4-$C_2F_5$—$C_6F_{10}$—$SO_2$—N($C_3H_7$)—COCH=$CH_2$.

Polymer (F) generally comprises recurring units derived from additional monomers different from monomer (MA) as above detailed; non limitative examples of monomers copolymerizable in polymer (F) with monomer (MA) are notably ethylene, vinyl acetate, vinyl chloride, vinyl fluoride, vinylidene chloride, vinylidene fluoride, vinyl chloroacetate, acrylonitrile, vinylidene cyanide, styrene, alkylated styrenes, halogenated styrenes, alkyl, hydroxyalkyl and epoxyalkyl esters of acrylic acid, methacrylic acid and chloroacrylic acid, N-alkyl and N-hydroxyalkyl amides of acrylic acid, methacrylic acid and chloroacrylic acid, methacrylonitrile, vinylcarbazole, vinyl pyrrolidone, vinyl pyridine, vinyl alkyl ethers, vinylalkyl ketones, butadiene, chloroprene, fluoroprene and isoprene.

It is nevertheless understood that polymer (F) generally comprises at least 50% wt of recurring units derived from monomer (MA).

Fluorinated (meth)acrylic polymers useful as component (B) of the composition of the invention are notably those described in U.S. Pat. No. 2,803,615 (3M COMPANY) Aug. 20, 1957, U.S. Pat. No. 2,995,542 (3M COMPANY) Aug. 8, 1961, U.S. Pat. No. 3,356,628 (3M COMPANY) Dec. 5, 1967, U.S. Pat. No. 4,525,423 (3M COMPANY) Jun. 26, 1985, U.S. Pat. No. 4,529,658 (3M COMPANY) Jul. 16, 1985, whose disclosures are herein incorporated by reference.

Suitable fluorinated (meth)acrylic polymers are commercially available notably under the tradename SCOTCHGUARD® from 3M company, UNIDYNE® from Daikin, or REPEARL® 8025 from Mitsubishi.

According to a second embodiment of the invention, the polymer (F) comprises said chain ($R_f$) linked by one or more urethane moiety of formula (III), as above detailed.

Polymer (F) according to this second embodiment of the invention is preferably selected among fluorochemical urethane compounds comprising chain $R_f$, that is to say, compounds derived from the reaction of at least one polyfunctional isocyanate compound, at least one hydrophilic polyoxyalkylene (e.g. a polyethyleneoxide, a polypropyleneoxyde or a copolymer of ethyleneoxyde and propylene oxyde), and at least one fluorocarbon monofunctional compound having one isocyanate-reactive functional group (e.g. —OH, —$NH_2$, —SH, —COOH—$NR^iH$, with $R^i$ being a $C_1$-$C_6$ alkyl group) and a perfluoroalkyl chain $R_f$ as above defined.

Representative examples of fluorocarbon monofunctional compound having one isocyanate-reactive functional group and comprising the perfluoroalkyl chain $R_f$ are notably: $CF_3(CF_2)_3SO_2N(CH_3)CH_2CH_2OH$, $CF_3(CF_2)_3SO_2N(CH_3)CH(CH_3)CH_2OH$, $CF_3(CF_2)_3SO_2N(CH_3)CH_2CH(CH_3)NH_2$, $CF_3(CF_2)_3SO_2N(CH_2CH_3)CH_2CH_2SH$, $CF_3(CF_2)_3SO_2N(CH_3)CH_2CH_2SCH_2CH_2OH$, $C_6F_{13}SO_2N(CH_3)(CH_2)_4OH$, $CF_3(CF_2)_7SO_2N(H)(CH_2)_3OH$, $C_4F_9SO_2N(CH_3)CH_2CH_2OH$, $CF_3(CF_2)_4SO_2N(CH_3)(CH_2)_4NH_2$, $C_4F_9SO_2N(CH_3)(CH_2)_{11}OH$, $CF_3(CF_2)_5SO_2N(CH_2CH_3)CH_2CH_2OH$, $CF_3(CF_2)_5SO_2N(CH_2CH_3)(CH_2)_6OH$, $CF_3(CF_2)_3SO_2N(C_3H_7)CH_2OCH_2CH_2CH_2OH$, $CF_3(CF_2)_4SO_2N(CH_2CH_2CH_3)CH_2CH_2OH$, $CF_3(CF_2)_4SO_2N(CH_2CH_2CH_3)CH_2CH_2NHCH_3$, $CF_3(CF_2)_3SO_2N(C_4H_9)CH_2CH_2NH_2$, $CF_3(CF_2)_3SO_2N(C_4H_9)(CH_2)_4SH$, $CF_3(CF_2)_3CH_2CH_2OH$, $CF_3(CF_2)_4CH_2CH_2OH$, $CF_3(CF_2)_5CH_2CH_2OH$, $CF_3(CF_2)_6CH_2CH_2OH$, $CF_3(CF_2)_7CH_2CH_2OH$, $CF_3(CF_2)_8CH_2CH_2OH$, n-$C_6F_{13}CF(CF_3)CON(H)CH_2CH_2OH$, n-$C_6F_{13}CF(CF_3)CO_2C_2H_4CH(CH_3)OH$.

Useful fluorochemical urethane compound comprising chain $R_f$ which can be used as component (B) in the composition according to the second embodiment of the invention are notably those described in US 2007014927 (3M INNOVATIVE PROPERTIES) Jan. 18, 2007, whose disclosures are hereby incorporated by reference.

The composition of the invention advantageously comprises at least 1% wt, preferably of at least 5% wt, more preferably of at least 8% wt of component (B) as above described, with respect to the total weight of (A), (B) and (C).

The composition of the invention advantageously comprises at most 30% wt, preferably of at most 25% wt of component (B) as above described, with respect to the total weight of (A), (B) and (C).

The crosslinking agent that can be used in the invention is not particularly restricted provided that it possesses at least two (i.e. two or more) reactive groups with the terminal and/or pendant reactive groups of the polymer (PUR). As the polymer (PUR) can be terminated either by isocyanate groups or by hydroxyl groups (or optionally, by amine groups, if a diamine is used as chain extender), the crosslinking agent should comprise at least two (i.e. two or more) groups able to react with an isocyanate group, a hydroxy group or an amine group. It is also possible to use a mixture of different crosslinking agents able to react with different reactive groups of the polymer (PUR).

The crosslinking agent which can be used in this invention are, notably, isocyanates, blocked isocyanates, polyalkoxysilanes, melamine formaldehydes and derivatives, epoxides, and anhydrides and derivatives thereof.

The crosslinker is preferably selected among blocked isocyanates because they provide softer handle in the substrate. Examples of blocked isocyanates are described in U.S. Pat. No. 5,401,553 (TAKEDA CHEMICAL INDUSTRIES LTD (JP)) Mar. 28, 1995, whose disclosures are hereby incorporated by reference.

The blocked polyisocyanate used in the invention is typically an adduct of a polyisocyanate and a blocking agent, which adds to free isocyanate groups of the polyisocyanate, to form the adduct to make the isocyanate groups inactive, but readily dissociates from the isocyanate groups to regenerate free isocyanate groups, e.g. when the adduct is heated to elevated temperatures, and/or put into contact with suitable reactive media (e.g. catalysts).

The blocked polyisocyanates include, for example, aliphatic polyisocyanates such as ethylene diisocyanate, tetramethylenediisocyanate, hexamethylene diisocyanate, 2,4,4- or 2,2,4-dimethylhexamethylene diisocyanate or methyl 2,6-diisocyanatocaproate; alicyclic diisocyanates, such as 3-isocyanatomethyl-3,5,5-trimethylcyclohexane, 1,3- or 1,4-bis(isocyanatomethyl)cyclohexane, methylcyclohexane 2,4- or 2,6-diisocyanate, dicyclohexylmethane-4,4-diisocyanate or 1,3- or 1,4-diisocyanatocyclohexane, aromatic diisocyanates, such as m- or phenylene diisocyanate, mixtures of these, diphenylmethane-4,4-diisocyanate, 2,4- or 2,6-tolylene diisocyanate or mixtures of these; and aromatic-aliphatic diisocyanates, such as 1,3- or 1,4-is(isocyanatomethyl benzene or 1,3- or 1,4-bis (alpha-isocyanatopropyl)benzene.

The polyisocyanates may be triisocyanates, such as triphenyl methane-4,4,-4-triisocyanate, 1,3,5-triisocyanatobenzene, 1,3,5-tris(isocyanatomethyl)cyclohexane, 1,3,5-tris (isocyanatomethyl)-benzene or 2-isocyanatoethyl 2,6-diisocyanatocaproate.

Other polyisocyanates are also usable to form the blocked polyisocyanate, such as polymeric polyisocyanates, e.g. dimers or trimers of diisocyanates, polymethylene polyphenylene polyisocyanates, various isocyanate terminated prepolymers which are obtainable by the reaction of polyisocyanates in excess and active hydrogen containing compounds, biuret derivatives or allophanate derivatives of polyisocyanates. These compounds may be used singly or as a mixture.

The active hydrogen containing compound usable is exemplified by low molecular weight compounds such as ethylene glycol, propylene glycol, diethylene glycol, dipropylene glycol, triethylene glycol, 2,2,4-trimethyl-1,3-pentanediol, neopentyl glycol, hexanediol, cyclohexanedimethanol, cyclohexanediol, hydrogenated bisphenol A, xylylene glycol, glycerine, trimethylol ethane, trimethylol propane, hexanetriol, pentaerythritol, sorbitol, sucrose castor oil, ethylenediamine, hexamethylenediamine, ethanolamine, triethanolamine, water, ammonia or urea, and a variety of high molecular weight compounds, such as polyether polyol, polyester polyol, acrylic polyol or epoxy polyol.

The blocking agent usable includes, for example, phenol-type blocking agents such as phenol, cresol, p-nonylphenol or hydroxybenzoic acid ester lactam-type blocking agents such as epsilon-caprolactam or gamma-butyrolactam, active methylene-type blocking agents such as diethyl malonate, methyl acetoacetate or acetylacetone; alcohol-type blocking agents such as ethanol, isopropyl alcohol, t-butyl alcohol, lauryl alcohol, ethylene glycol-monoethyl ether, benzyl alcohol, glycolic acid, glycolates such as methyl glycolate, ethyl glycolate or butyl glycolate or butyl glycolate, lactic acid, lactic acid esters such as methyl lactate, ethyl lactate or butyl lactate, diacetone alcohol or ethylene chlorohydrin; mercaptan-type blocking agents such as butyl mercaptan, octyl mercaptan, t-dodecyl mercaptan, 2-mercaptobenzothiazole or thiophenol; acid amide-type blocking agents such as acetanilide, acetamide, acrylamide or benzamide, imido-type blocking agents such as succinimide or phthalimide; amine-type blocking agents such as diphenylamine, carbazole, aniline, dibutylammine; imidazole-type blocking agents such as imidazole or 2-ethylimidazole; urea-type blocking agents such as urea, thiourea, ethylene thiourea, carbamate-type blocking agents such as 2-oxazolidone, phenyl N-phenyl carbamate; oxime-type blocking a gents such as formaldoxime, acetaldoxime, acetoxime, methyl ethyl ketoxime, diacetyl monoxime, cyclohexanone oxime or benzophenone oxime, and sulfite-type blocking agents such as sodium bisulphite or potassium bisulphite.

Particularly preferred are ketoxime-blocked polyisocyanates.

One useful cross-linking component is REPEARL® MF, available from Mitsubishi Corp. HYDROPHOBOL® XAN is another compound available from DuPont, which may be employed.

The composition of the invention advantageously comprises at least 10% wt, preferably of at least 15% wt, more preferably of at least 20% wt of component (C) as above described, with respect to the total weight of (A), (B) and (C).

The composition of the invention advantageously comprises at most 45% wt, preferably of at most 35% wt, more preferably of at most 30% wt, even more preferably at most 25% wt of component (C) as above described, with respect to the total weight of (A), (B) and (C).

Composition according to the invention is advantageously an aqueous composition. In the aqueous composition of the invention components (A), (B) and (C) are totally or partially suspended and/or at least partially solubilized in water.

Compositions which were found to give particularly good results in terms of both stain repellence and soil release, coupled with outstanding durability are those comprising:
component (A) [polymer (PUR)] in an amount from 55 to 70% wt, with respect to the total weight of (A), (B) and (C);
component (B) [polymer (F)] in an amount from 8 to 25% wt, with respect to the total weight of (A), (B) and (C);
component (C) [crosslinking agent] in an amount from 20 to 25% wt, with respect to the total weight of (A), (B) and (C).

The composition of the invention can comprise, in addition to components (A), (B) and (C), as above detailed, other ingredients, such as, notably, softeners, catalysts, anti-wrinklers and the like. The skilled in the art will select among standard customary ingredients as a function of the nature of the textile substrate.

Another object of the invention is a process for the manufacture of the composition as above detailed.

The process of the invention advantageously comprises mixing aqueous solutions and/or dispersions of components (A), (B) and (C) as above defined.

Still another object of the invention is the use of the composition as above detailed for the treatment of textile substrates.

Illustrative textile substrates which can be advantageously treated with the composition of the invention are those based on natural fibers, e.g. cotton, wool, mohair, linen, jute, silk, ramie, sisal, kenaf, etc., and those based on synthetic fibers, e.g. rayon, acetate, acrylic, polyester, azylon, nitril, polyamide, olefin, and the like.

The composition of the invention can be used in the treatment of textile substrates either alone or in combination with other treating agents, such as softeners, anti-wrinklers, and the like.

When treating the textile substrates with the composition of the invention is it advantageously possible to obtain textile substrates having outstanding stain repellence and soil release without negatively affect the "hand", appearance, flexibility, strength or porosity of the textile substrate.

In this treatment the sizing of the textile substrate is generally carried out so that a thin coating is provided on the textile substrate.

The invention also pertains to the textile substrates, as above defined, obtained from said treatment.

The invention will be now described in more detail with reference to the following examples, whose purpose is merely illustrative and not limiting the scope of the invention.

Raw Materials

The commercial products used for the preparation of the compositions are listed below:

Soil Release Fluorinated Agent (Polymer (F))

UNIDYNE® TG 992 (available from Daikin America Inc.): 30% weight solids content emulsion of Fluoroacrylate copolymer.

Stain Repellent (Water & Oil Repellent) Fluorinated Agent (Polymer (F))

REPEARL® F-8025 (available from Mitsubishi International Corporation Specialty Chemicals, Inc.): 30% weight solids content emulsion of an amphoteric Fluoroacrylate copolymer.

Crosslinking Agent

REPEARL® MF (available from Mitsubishi International Corporation Specialty Chemicals, Inc.): Blocked isocyanate compound, formaldehyde-free cross-linking agent, having a solids content of 29% weight.

Durable Press/Wrinkle Free Resins

PERMAFRESH® MFX (available from Omnova Solutions Inc.): emulsion of an Alkylated Dimethylol Dihydroxy Ethyleneurea.

FREEREZ® PFK (available from Noveon Inc.): 52% weight solids content emulsion of a glyoxal-based reactant with ultra-low formaldehyde content.

Catalyst

Catalyst 531® (available from Omnova Solutions Inc.): 19% weight solids content solution of Magnesium Chloride and additives.

Catalyst KR® (available from Omnova Solutions Inc.): 30% weight solids content solution of Magnesium Chloride.

Softener

MYKON HLC® (available from Omnova Solutions Inc.): 42% weight solids content emulsion of Polyethylene.

DOUSOFT® 1062 (available from Boehme Filatex): 25% weight solids content emulsion of very high density Polyethylene.

Test Methods

Soil Release Test (AATCC 130-2000)

This test method is designed to measure the ability of fabrics to release forced-in oily stains during simulated home laundering.

As indicated below, two stains were applied: mineral oil and corn oil. These stains (five drops of each stain) were applied to the same area of the fabric with a dropper from a short distance above, covered with glassine paper and pressed therein with a stainless steel cylinder (6.4 cm diam, weight 2.268 Kg) for one minute. The stained fabric is then laundered within 20±5 minutes after staining in a prescribed manner and the residual stain rated on a scale from 5 to 1 by comparison with a stain release replica showing a graduated series of stains, with "1" indicating the poorest degree of stain removal, and "5" indicating the best degree of stain removal.

Oil Repellence Test (AATCC 118-2002)

The oil repellence of a substrate was measured by the American Association of Textile Chemists and Colorists (AATCC) Standard Test Method No. 118-2002. This test is based on the resistance of a treated substrate against penetration by oils having different surface tensions. A drop of each of said oils is dropped on a treated fabric; if after thirty seconds there is no wetting, the next highest standard number oil (next lowest surface tension) is tested. When the lowest number oil soaks into the fabric, the next lower number is the rating. Treated substrates resistant only to NUJOL® mineral oil (the least penetrating of the test oils) were given a rating of 1, whereas treated substrates resistant to heptane (the most penetrating of the test liquids) were given a ratio of 8.

TABLE 1

| Rating number | Compositions | Surface tension (25° C.) mN/m |
|---|---|---|
| 1 | Nujol | 31.2 |
| 2 | 65:35 Nujol:n-Hexadecane (volume) | 29.6 |
| 3 | n-Hexadecane | 27.3 |
| 4 | n-Tetradecane | 26.7 |
| 5 | n-Dodecane | 25 |
| 6 | n-Decane | 23.5 |
| 7 | n-Octane | 21.8 |
| 8 | n-Heptane | 20 |

Water Repellence Test (Spray Rating AATCC 22-2001)

The spray rating of a treated substrate is a value indicative of the dynamic repellence of the treated substrate to water that impinges on the treated substrate. The repellence was expressed in terms of 'spray rating' of the tested substrate. The spray rating was obtained by spraying 250 ml water on the substrate from a height of 15 cm. The wetting pattern was visually rated using a 0 to 100 scale, where 0 means complete wetting and 100 means no wetting at all.

SYNTHESIS OF POLYMERS (PUR)

Example 1

Synthesis of Polymer (PUR-1)

Following the teaching of U.S. Pat. No. 6,500,984 (AUSIMONT SPA) Dec. 31, 2002, a cationic polyurethane was synthesized by reacting:

250 g of (per)fluoropolyether (PFPE) diol (FLUOROLINK® D10H), having hydroxyl equivalent weight 750 (333 meq.);

73.26 g of isophorone di-isocyanate (666 meq);

9.8 g of 3-dimethylamino-1,2-propandiol (DMAPD) (167 meq); and 7.5 g of butandiol (167 meq).

An aqueous dispersion with a solid content, determined as dry residue, of 25% by weight of polymer (PUR-1) having cationic group was obtained (Cfr. Example 2 of above mentioned US patent).

Example 2

Synthesis of Polymer (PUR-2)

Following the teachings of EP 1369442 A (SOLVAY SOLEXIS SPA) Dec. 10, 2003, an anionic polyurethane was synthesized reacting:

507 g of (per)fluoropolyether (PFPE) diol (Fluorolink® D10H), having hydroxyl equivalent weight 761 (666 meq.);
148 g of isophorone diisocyanate (1333 meq); and
46 g of dimethylpropionic acid (DMPA) (671 meq) salified with 27 g of triethyl amine (267 meq).

An aqueous dispersion with a solid content, determined as dry residue, of 25% by weight of polymer (PUR-2) having anionic group was obtained.

Example 3

Synthesis of Polymer (PUR-3)

Following the teachings of EP 1559733 A (SOLVAY SOLEXIS SPA (IT)) Aug. 3, 2005, a cationic polyurethane was synthesized reacting:
179 g of (per)fluoropolyether (PFPE) diol (Fluorolink® D10H), having hydroxyl equivalent weight 750 (239 meq.);
53 g of isophorone diisocyanate (477 meq);
7 g of 3-diethylamino-1,2-propandiol (DEAPD) (95 meq);
6.7 g of N-(2-aminoethyl)-aminopropyltrimethoxysilane (AEAPTMS) (60 meq); and
3.2 g of propanediol (84 meq).

An aqueous dispersion with a solid content, determined as dry residue, of 25% by weight of polymer (PUR-3) having cationic group was obtained.

Preparation of Textile Treatment Compositions

Example 4

Composition for Cotton Treatment 60 g of the water based polymer (PUR-1) dispersion of the Example 1 were mixed with:
20 g of REPEARL® 8025
20 g of REPEARL® MF
80 g of FREEREZ® PFK
20 g of Catalyst 531
20 g of DOUSOFT® 1062
The mixture was then diluted with water to a total volume of 1 liter.

Example 5

Composition for Cotton Treatment 60 g of the water based polymer (PUR-3) dispersion of the Example 3 were mixed with:
20 g of REPEARL® 8025
20 g of REPEARL® MF
80 g of FREEREZ® PFK
20 g of Catalyst 531
20 g of DOUSOFT® 1062
The mixture was then diluted with water to a total volume of 1 liter.

Example 6

Formulation for Polyester Treatment 60 g of the water based polymer (PUR-1) dispersion of the Example 1 were mixed with:
20 g of REPEARL® 8025
20 g of REPEARL® MF
The mixture was then diluted with water to a total volume of 1 liter.

Example 7

Formulation for Polyester Treatment 60 g of the water based dispersion of the Example 2 were mixed with:
20 g of REPEARL® 8025
20 g of REPEARL® MF
The mixture was then diluted with water to a total volume of 1 liter.

Example 8

Formulation for Polyester Treatment 60 g of the water based polymer (PUR-3) dispersion of the Example 3 were mixed with:
20 g of REPEARL® 8025
20 g of REPEARL® MF
The mixture was then diluted with water to a total volume of 1 liter.

Example 9

Formulation for Cotton/Polyester Treatment 60 g of the water based dispersion of the Example 1 were mixed with:
20 g of REPEARL® 8025
20 g of REPEARL® MF
50 g of PERMAFRESH® MFX
12.5 g of Catalyst KR
2.5 g of MYKON® HLC
The mixture was then diluted with water to a total volume of 1 liter.

Example C-10

Formulation for Cotton Treatment without Crosslinking Agent 60 g of the water based polymer (PUR-1) dispersion of the Example 1 were mixed with:
20 g of REPEARL® 8025
80 g of FREEREZ® PFK
20 g of Catalyst 531
20 g of DUOSOFT® 1062
The mixture was then diluted with water to a total volume of 1 liter.

Example C-11

Formulation for Cotton Treatment without Crosslinking Agent 60 g of the water based polymer (PUR-3) dispersion of the Example 3 were mixed with:

20 g of REPEARL® 8025
80 g of FREEREZ® PFK
20 g of Catalyst 531
20 g of DUOSOFT® 1062
The mixture was then diluted with water to a total volume of 1 liter.

Example C-12

Formulation for Cotton/Polyester Treatment without Crosslinking Agent 60 g of the water based polymer (PUR-1) dispersion of the Example 1 were mixed with:
20 g of REPEARL® 8025
50 g of PERMAFRESH® MFX
12.5 g of Catalyst KR
2.5 g of MYKON® HLC
The mixture was then diluted with water to a total volume of 1 liter.

Example C-13

Formulation for Cotton/Polyester Treatment without Crosslinking Agent 60 g of the water based polymer (PUR-3) dispersion of the Example 3 were mixed with:
20 g of REPEARL® 8025
50 g of PERMAFRESH® MFX
12.5 g of Catalyst KR
2.5 g of MYKON® HLC
The mixture was then diluted with water to a total volume of 1 liter.

Example C-14

Formulation for Cotton without Polymer (PUR)

60 g of the water based dispersion UNIDYNE® TG 992 were mixed with:
20 g of REPEARL® 8025
20 g of REPEARL® MF
80 g of FREEREZ® PFK
20 g of Catalyst 531
20 g of DUOSOFT® 1062
The mixture was then diluted with water to a total volume of 1 liter.

Example C-15

Formulation for Polyester without Polymer (PUR)

60 g of the water based dispersion UNIDYNE® TG 992 were mixed with:
20 g of REPEARL® 8025
20 g of REPEARL® MF
The mixture was then diluted with water to a total volume of 1 liter.

Example C-16

Formulation for Cotton/Polyester without Polymer (PUR)

60 g of the water based dispersion UNIDYNE® TG 992 were mixed with:
20 g of REPEARL® 8025
20 g of REPEARL® MF
50 g of PERMAFRESH® MFX
12.5 g of Catalyst KR
2.5 g of MYKON® HLC
The mixture was then diluted with water to a total volume of 1 liter.

Example 17

Formulation for Cotton/Polyester 60 g of the water based polymer (PUR-1) dispersion of the Example 1 were mixed with:
8 g of REPEARL® 8025
20 g of REPEARL® MF
50 g of PERMAFRESH® MFX
12.5 g of Catalyst KR
2.5 g of MYKON® HLC
The mixture was then diluted with water to a total volume of 1 liter.

Textiles Substrates Treatments
Fabrics
The following textile substrates were used:
1. 100% polyester, twill
2. 100% cotton twill, Test Fabric style 423 (bleached and mercerize), 8 oz/sq. yard
3. 65/35 polyester/cotton poplin, Test Fabric style 7436, 8 oz/sq. yard
Equipment:
1. 2 roll lab padder (13 inch face, rubber rolls) L&W Machine Works.
2. 11×11 inch pin frames
3. Dispatch forced air recirculation oven
4. Washing machine—Wonder Washer mini washing machine, 500 gms of fabric in 8 liters of water/detergent.
5. Dryer: Whirlpool home dryer
Method for the Treatment of Textile Substrates:
12×12 inch swatches were dipped in 200 ml of the finish bath, run through the padder and placed on the pin frames. The padder was adjusted to give a 65-70% wet pick-up. The padded fabrics were dried and cured 5 minutes at 170° C. in the dispatch forced air recirculation oven.

Results of soil release properties and of oil and water repellence properties of the textile substrates treated with the compositions of examples 4 to 17 are summarized in the following tables. Values have been determined on the textile substrates immediately after treatment ("0 w"), after 5 washing cycles ("5 w"), after 10 washing cycles ("10 w") and/or after 30 washing cycles ("30 w").

100% Cotton

TABLE 2

| | Water repellence | | | Oil repellence | | | Soil release | | | | | |
|---|---|---|---|---|---|---|---|---|---|---|---|---|
| | | | | | | | Mineral oil | | | Corn oil | | |
| Ex. | 0 w | 5 w | 10 w | 0 w | 5 w | 10 w | 0 w | 5 w | 10 w | 0 w | 5 w | 10 w |
| 4 | 100 | 100 | 100 | 5 | 5 | 5 | 4 | 5 | 4 | 2 | 4 | 4 |
| 5 | 100 | 100 | 100 | 6 | 5 | 5 | 3 | 4 | 4 | 2 | 4 | 4 |
| C-9 | 50 | 50 | 50 | 6 | 3 | 4 | 5 | 5 | 4 | 4 | 5 | 4 |
| C-10 | 50 | 50 | 50 | 6 | 4 | 5 | 5 | 5 | 4 | 3 | 4 | 4 |
| C-11 | 85 | 70 | 50 | 6 | 6 | 6 | 4 | 5 | 4 | 5 | 5 | 4 |

100% Polyester

TABLE 3

| | Water repellence | | | Oil repellence | | | Soil release | | | | | |
|---|---|---|---|---|---|---|---|---|---|---|---|---|
| | | | | | | | Mineral oil | | | Corn oil | | |
| Ex. | 0 w | 5 w | 10 w | 0 w | 5 w | 10 w | 0 w | 5 w | 10 w | 0 w | 5 w | 10 w |
| 6 | 100 | 100 | 100 | 6 | 6 | 6 | 2 | 5 | 5 | 2 | 5 | 5 |
| 7 | 100 | 100 | 100 | 5 | 5 | 4 | 2 | 3 | 4 | 3 | 5 | 4 |
| 8 | 100 | 100 | 100 | 6 | 6 | 5 | 2 | 4 | 4 | 2 | 5 | 5 |
| C-14 | 50 | 70 | 70 | 7 | 6 | 6 | 5 | 3 | 4 | 5 | 5 | 5 |

65/35 Polyester/Cotton

TABLE 4

| | Water repellence | | | Oil repellence | | | Soil release | | | | | |
|---|---|---|---|---|---|---|---|---|---|---|---|---|
| | | | | | | | Mineral oil | | | Corn oil | | |
| Ex. | 0 w | 10 w | 30 w | 0 w | 10 w | 30 w | 0 w | 10 w | 30 w | 0 w | 10 w | 30 w |
| 9 | 100 | 100 | 100 | 6 | 5 | 5 | 3 | 5 | 5 | 2 | 4 | 5 |
| 17 | 100 | 100 | 100 | 5 | 4 | 4 | 3 | 4 | 4 | 3 | 4 | 4 |
| C-12 | 70 | 70 | 70 | 4 | 4 | 4 | 3 | 4 | n.a. | 3 | 3 | n.a. |
| C-13 | 70 | 70 | 70 | 5 | 4 | 3 | 4 | 4 | n.a. | 3 | 4 | n.a. |
| C-16 | 100 | 95 | 85 | 6 | 5 | 5 | 4 | 4 | 3 | 5 | 4 | 4 |

The invention claimed is:

1. A composition useful for imparting durable stain repellence and soil release properties to textile substrates, said composition comprising:

(A) at least one fluorinated ionisable polyurethane polymer [polymer (PUR)] comprising at least one fluorinated block comprising a fluoropolyoxyalkene chain [chain $(R_{of})$], and at least one functional block comprising an hydrocarbon chain [chain $(R_{HC})$] having from 2 to 14 carbon atoms, optionally comprising one or more aromatic or cycloaliphatic group, said chain $(R_{HC})$ comprising at least one ionisable group, said blocks being linked by urethane moieties of formula (I):

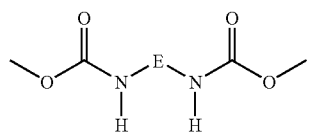

formula (I)

wherein E is a divalent hydrocarbon carbon group, linear or branched, optionally comprising aromatic rings, said polymer (PUR) being free from perfluoroalkyl chains [chain $(R_f)$];

(B) at least one fluorocarbon polymer [polymer (F)] comprising at least one perfluoroalkyl chain [chain $(R_f)$] linked by one or more ester moiety of formula (II) and/or urethane moiety of formula (III) and/or urea moiety of formula (IV):

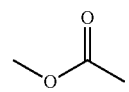

formula (II)

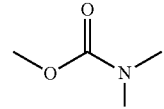

formula (III)

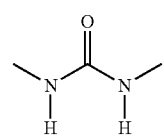

formula (IV)

and
(C) at least one crosslinking agent selected from blocked isocyanates,
wherein the amount of (A) is from 55% to 70% by weight, with respect to the total weight of (A), (B) and (C),
wherein the amount of (B) is from 8% to 25% by weight, with respect to the total weight of (A), (B) and (C), and
wherein the amount of (C) is from 20% to 25% by weight, with respect to the total weight of (A), (B) and (C).

2. The composition of claim 1, wherein chain ($R_{of}$) of the polymer (PUR) comprises repeating units R°, said repeating units R°, randomly distributed along the fluoropolyoxyalkene chain, being selected from the group consisting of:

—CFXO—, wherein X is F or $CF_3$, (i)

—$CF_2$CFXO—, wherein X is F or $CF_3$, and (ii)

—$CF_2CF_2CF_2$O— (iii).

3. The composition of claim 1, wherein chain ($R'_{HC}$) of polymer (PUR) is selected from the group consisting of:
(j) carboxylic-containing chain ($R'_{HC}$) of formula:

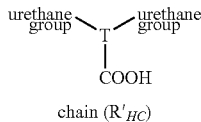

chain ($R'_{HC}$)

wherein T is an hydrocarbon trivalent group, linear or branched, cyclic or not, aliphatic or aromatic, comprising from 2 to 12 carbon atoms;
(jj) amine-containing chain ($R''_{HC}$) of formula:

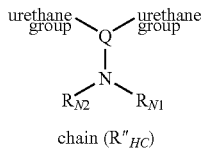

chain ($R''_{HC}$)

wherein $R_{N1}$ and $R_{N2}$, equal or different from each other, are independently selected from H and hydrocarbon groups having 1 to 6 carbon atoms; Q is an hydrocarbon trivalent group, linear or branched, cyclic or not, aliphatic or aromatic, comprising from 2 to 12 carbon atoms; and
(jjj) amine-containing chain ($R'''_{HC}$) of formula:

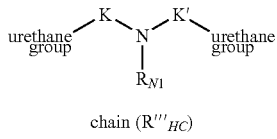

chain ($R'''_{HC}$)

wherein $R_{N1}$ has the same meaning as defined in (jj); K and K' being divalent hydrocarbon groups having 1 to 6 carbon atoms.

4. The composition of claim 1, wherein the divalent hydrocarbon group E of urethane moieties of polymer (PUR) is selected from the group consisting of:

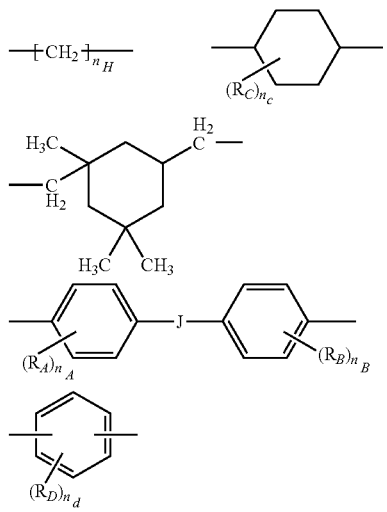

and mixtures thereof;
wherein:
$n_H$ is an integer from 1 to 12;
J is a divalent bridging group selected from the group consisting of: a single bond; a methylene group (—$CH_2$—); an oxygen atom (—O—); a —$C(CH_3)_2$— group; a —$C(CF_3)_2$— group; a —$SO_2$— group; and a —C(O)— group;
each of $R_A$, $R_B$, $R_C$, $R_D$, equal or different at each occurrence, is independently a halogen atom, a $C_1$-$C_6$ hydrocarbon group, a substituent group of any of formulae: —$OR_H$, —$NR_H R_{H''}$, or —C(O)—$R_{H'''}$, wherein $R_H$, $R_{H'}$, $R_{H''}$, $R_{H'''}$, equal to or different from each other, are independently at each occurrence a hydrogen atom or a $C_1$-$C_6$ hydrocarbon group;
$n_A$, $n_B$, $n_d$, are independently an integer chosen between 0 and 4;
$n_C$ is an integer from 0 to 10.

5. The composition of claim 1, wherein, the polymer (F) comprises recurring units derived from at least one (meth) acrylic monomer [monomer (MA)] of formula:

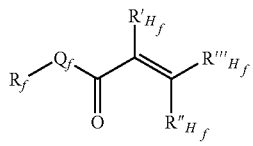

wherein;
$Q_f$ is a divalent radical having from 0 to 12 carbon atoms; $Q_f$ optionally containing skeletal nitrogen, oxygen or sulfur atoms;
$R'_{Hf}$, $R''_{Hf}$, $R'''_{Hf}$, equal to or different from each other, are independently H or a $C_{1-4}$ alkyl radical;
$R_f$ is a perfluoroaliphatic group, linear or branched, cyclic or not, comprising from 4 to 20 carbon atoms.

6. The composition of claim 1, wherein the polymer (F) is selected among fluorochemical urethane compounds comprising chain $R_f$, said compounds being derived from the reaction of at least one polyfunctional isocyanate compound, at least one hydrophilic polyoxyalkylene, and at least one fluorocarbon monofunctional compound having one isocyanate-reactive functional group and a perfluoroalkyl chain $R_f$.

7. A process for the manufacture of the composition according to claim 1, comprising combining the components (A), (B), and (C).

8. A method for imparting durable stain repellence and soil release properties to textile substrates, comprising treating a textile substrate with the composition of claim 1.

9. The method according to claim 8, wherein the textile substrates are those based on natural fibers, and those based on synthetic fibers.

10. A textile substrate obtained from the method according to claim 8.

11. The method according to claim 8, wherein the textile substrate which is treated is based on a natural fiber, or on a synthetic fiber, or on a blend of natural and synthetic fibers, the natural fiber being selected from the group consisting of cotton, wool, mohair, linen, jute, silk, ramie, sisal, and kenaf, and the synthetic fiber being selected from the group consisting of nylon, rayon, acetate, acrylic, polyester, azylon, nitril, polyamide, and olefin.

12. The process according to claim 7 wherein the combining step includes mixing aqueous solutions and/or dispersions of the components (A), (B) and (C).

* * * * *